(12) United States Patent
Patel et al.

(10) Patent No.: US 12,038,097 B2
(45) Date of Patent: Jul. 16, 2024

(54) SLIDE VALVE

(71) Applicant: Fike Corporation, Blue Springs, MO (US)

(72) Inventors: Devang Patel, Bedfordshire (GB); Gene Hill, Odessa, MO (US); Andrew Tworek, Overland Park, KS (US); E. Dean Miller, Lee's Summit, MO (US); Bradford T. Stilwell, Blue Springs, MO (US)

(73) Assignee: Fike Corporation, Blue Springs, MO (US)

( * ) Notice: Subject to any disclaimer, the term of this patent is extended or adjusted under 35 U.S.C. 154(b) by 366 days.

(21) Appl. No.: 17/392,490

(22) Filed: Aug. 3, 2021

(65) Prior Publication Data

US 2022/0042606 A1 Feb. 10, 2022

Related U.S. Application Data

(60) Provisional application No. 63/060,760, filed on Aug. 4, 2020.

(51) Int. Cl.
*F16K 3/26* (2006.01)
*A62C 35/68* (2006.01)
*F16K 31/122* (2006.01)

(52) U.S. Cl.
CPC .............. *F16K 3/265* (2013.01); *A62C 35/68* (2013.01); *F16K 31/1221* (2013.01)

(58) Field of Classification Search
CPC ...... F16K 3/265; F16K 31/1221; A62C 35/68
USPC ...................... 169/19, 20; 239/570–572, 583
See application file for complete search history.

(56) References Cited

U.S. PATENT DOCUMENTS

| | | | |
|---|---|---|---|
| 3,093,155 | A | 6/1963 | Dawes |
| 4,337,797 | A | 7/1982 | Caruso |
| 4,830,331 | A | 5/1989 | Vindum |
| 6,871,802 | B2 | 3/2005 | Stilwell et al. |
| 7,159,611 | B2 | 1/2007 | Larsen |
| 7,275,559 | B2 | 10/2007 | Morrison et al. |
| 7,398,793 | B2 | 7/2008 | Itano et al. |
| 7,575,021 | B2 | 8/2009 | Carnall |
| 7,726,344 | B2 | 6/2010 | Knapp |
| 9,823,668 | B2 | 11/2017 | Pechtold et al. |
| 2004/0194977 | A1 | 10/2004 | Stilwell et al. |

(Continued)

FOREIGN PATENT DOCUMENTS

| | | |
|---|---|---|
| CN | 103629422 A | 3/2014 |
| JP | S5610869 | 2/1981 |

(Continued)

OTHER PUBLICATIONS

International Search Report and Written Opinion in corresponding PCT/US2021/044263, dated Nov. 26, 2021.

*Primary Examiner* — Christopher S Kim
(74) *Attorney, Agent, or Firm* — Hovey Williams LLP

(57) ABSTRACT

A valve comprising a slidable internal shuttle that is shiftable between a valve closed and a valve open configuration is provided. The valve can be configured so that minimal force is required to effect shifting of the shuttle, even though the valve can be of a large diameter. In the valve closed configuration, the shuttle blocks communication between the valve inlet and outlet. Sliding of the shuttle to the valve open configuration permits fluid to flow through the valve. The shuttle can be configured with internal surfaces that provide some or no biasing forces acting upon the shuttle in the valve closed direction.

20 Claims, 8 Drawing Sheets

(56) References Cited

U.S. PATENT DOCUMENTS

| | | |
|---|---|---|
| 2007/0144595 A1 | 6/2007 | Geva |
| 2008/0128144 A1 | 6/2008 | Blease et al. |
| 2016/0281337 A1 | 9/2016 | Ochiai et al. |

FOREIGN PATENT DOCUMENTS

| | | |
|---|---|---|
| JP | 2004239284 | 9/2008 |
| KR | 2010-0027424 | 3/2010 |
| WO | 2006070116 | 7/2006 |
| WO | 2016150509 | 9/2016 |

SLIDE VALVE

RELATED APPLICATION

This Application claims the benefit of U.S. Provisional Patent Application No. 63/060,760, filed Aug. 4, 2020, which is incorporated by reference herein in its entirety.

BACKGROUND OF THE INVENTION

Field of the Invention

The present invention is generally directed toward a valve that comprises an internal shuttle that, through the input of a low magnitude force, can slide between a valve closed configuration in which the shuttle blocks the passage of a fluid through the valve and a valve open configuration in which the shuttle permits passage of the fluid through the valve. The valve is particularly suited for use in fire suppression systems and pipelines, particularly in applications where a large diameter valve is required.

Description of the Prior Art

In conventional fire suppression systems, a fire suppression agent, such as an inert gas agent, is stored in one or more vessels that are connected to a distribution network that delivers the agent to the areas that are protected by the system. Release of the fire suppressing agent is controlled by a valve that may be manually operated or, in certain applications, is automatically actuated in response to detection of a fire hazard within the protected area. Conventional valves that have been employed in these types of systems include gate and ball valves. Each type of valve has certain advantages and drawbacks.

A gate valve comprises a retractable plate or gate member. When the gate is deployed, the gate blocks the flow of fluid through the valve. However, when the gate is retracted, the fluid is permitted to flow freely through the valve. Gate valves are of relatively simple construction and have been used quite commonly in isolation applications to protect equipment from upstream or downstream hazardous conditions, such as an explosion or fire. In isolation applications, the gate valve is normally maintained in an open position and then closed when the hazardous condition is detected. Closure of the valve can be achieved quite rapidly by using gas-generating devices or another source of compressed gas. However, opening of gate valves is not conventionally controlled in the same manner and often requires a motor to retract the gate. Further, given the path of travel of the gate, opening of the gate valve can be a slower process.

Ball valves comprise a rotatable ball that have a passage formed therein. The ball can be rotated to place the passage in communication with the valve inlet and outlet. Ball valves have the advantage in that the ball does not require as much displacement as a gate valve in order to shift from the closed to open position. However, in the case of large diameter valves and/or valves used in high-pressure applications, a significant amount of external force can be required to rotate the ball.

Other applications that require the use of large diameter valves, including pipelines and distribution pipe work, may exhibit similar issues with conventional ball and gate valves to control the flow of fluid.

Accordingly, there is a need in the art for a valve that can be used in applications in which rapid opening is desirable, but can be operated with reduced external force, particularly when large pipe diameters are required.

SUMMARY OF THE INVENTION

One or more embodiments of the present invention address the problems associated with certain prior art devices by providing a valve that can be operated quickly and with a reduced input force, especially in large diameter applications.

According to one embodiment of the present invention there is provided a valve that comprises a valve body having a valve inlet section, a valve outlet section, and an internal shuttle. The valve inlet section comprises a valve inlet configured to be coupled to a source of a pressurized fluid, and the valve outlet section comprises a valve outlet. The valve body also defines a valve chamber. The valve inlet section comprises an inlet tubular member that extends into the valve chamber and has an inlet passage that interconnects the valve inlet and the valve chamber. The valve outlet section comprises an outlet tubular member that extends into the valve chamber and has an outlet passage that is configured to conduct the pressurized fluid flowing through the valve toward the valve outlet. The shuttle is located within the valve chamber and comprises a bore formed therethrough. In certain embodiments, the shuttle is slidably received over the inlet and outlet tubular members and is shiftable between a valve closed configuration in which the shuttle blocks communication between the inlet and outlet passages and a valve open configuration in which the inlet passage is in fluid communication with the outlet passage. The shuttle bore defines a shuttle chamber having interior surfaces upon which the pressurized fluid acts to produce a first force acting upon the shuttle biasing the shuttle toward the valve closed configuration and a second force acting upon the shuttle biasing the shuttle toward the valve open configuration.

According to another embodiment of the present invention there is provided a pipework system comprising a source of a pressurized fluid, and a selectively actuatable valve according to any embodiment described herein that is configured to control the flow of the pressurized fluid through the pipework system.

According to still another embodiment of the present invention, there is provided a method of controlling the flow of a fluid through a pipework system. The method comprises providing a source of a pressurized fluid and a selectively actuatable valve operably coupled to the source that is configured to control the flow of the pressurized fluid through the pipework system. The selectively actuatable valve comprises any valve described herein. When desired to control the flow of the pressurized fluid from the source, the shuttle is shifted from either the valve closed configuration or valve open configuration to the opposite configuration to either block or permit fluid communication of the shuttle bore with an outlet passage within the valve. The flow of pressurized fluid through the pipework then is either initiated or stopped depending upon the new shuttle configuration.

Figure 1:
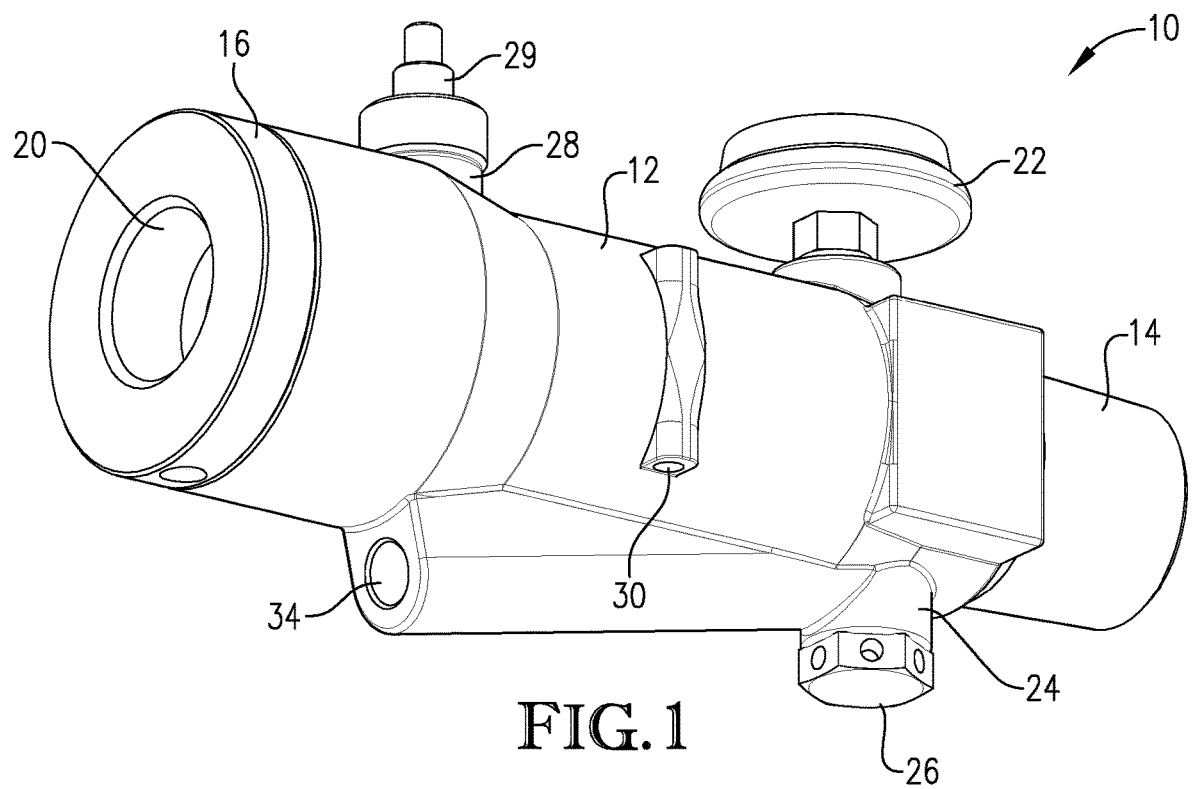
FIG. 1 is a perspective view of an embodiment of a valve according to the present invention.

While the drawings do not necessarily provide exact dimensions or tolerances for the illustrated components or structures, the drawings are to scale with respect to the relationships between the components of the structures illustrated in the drawings.

DETAILED DESCRIPTION OF THE PREFERRED EMBODIMENT

The following description and accompanying figures are directed toward various embodiments of the present invention. They are exemplary and provided by way of illustration and should not be viewed as limiting upon the overall scope of the present invention.

Figure 2:
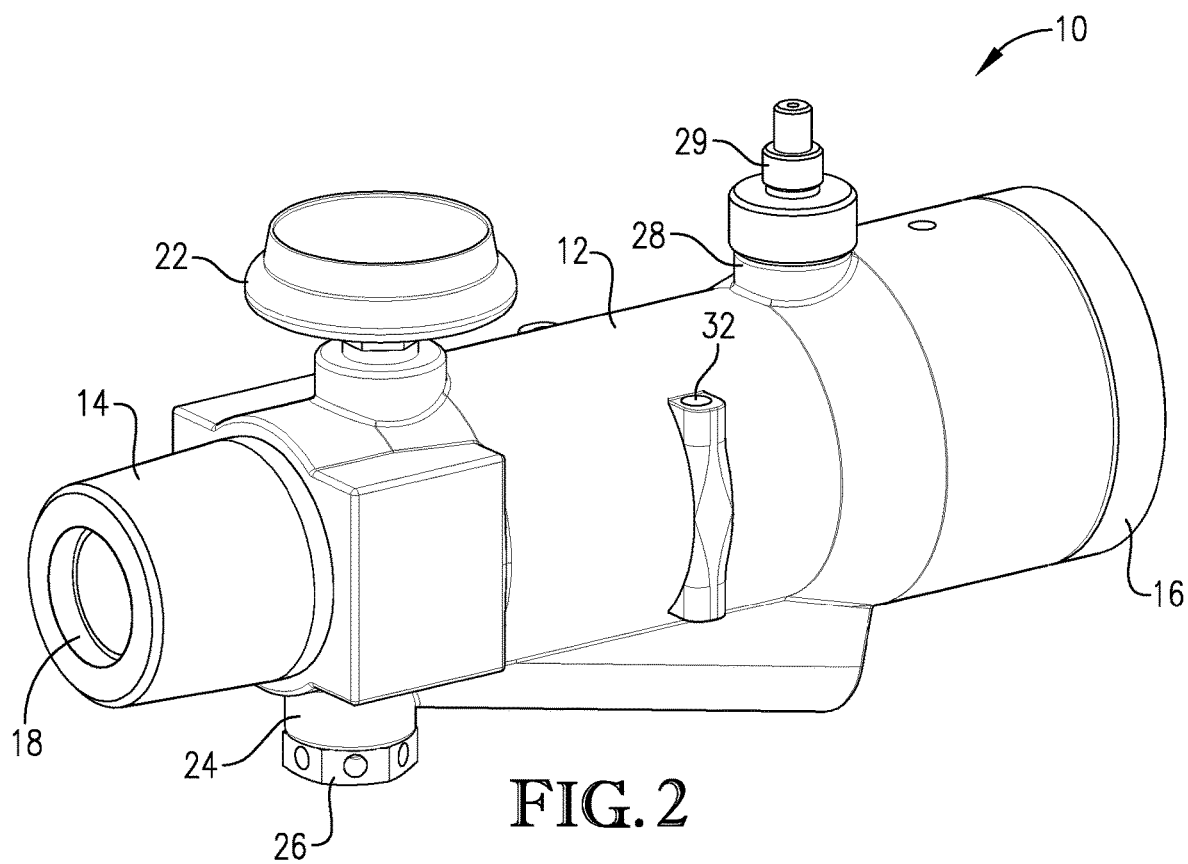
FIG. 2 is an alternate perspective vie of the valve of FIG. 1.

Turning to FIGS. 1 and 2, an embodiment of a valve 10 according to the present invention is illustrated. Valve 10 comprises a valve body 12 that includes a valve inlet section 14 and a valve outlet section 16. The valve inlet section 14 comprises a valve inlet 18 that is configured to be coupled to a source of a pressurized fluid, such as a vessel or pipework system containing a fire suppression agent or pressurized. The valve outlet section 16 comprises a valve outlet 20, which, as explained in greater detail below, can be configured to be coupled to a conduit or pipework system for transmission of the pressurized fluid. As used herein, the term "pipework system" includes but is not limited to any network of conduit, tubes, or pipes operable to conduct a fluid between two or more locations. Examples of pipework systems include inground or above-ground pipelines, process lines within a factory or plant, and fire suppression systems. The pipework system also generally comprises a source of the pressurized fluid being transmitted therethrough. The source of the pressurized fluid can be any fluid feed stream or reservoir that is located upstream of the valve inlet 18. Exemplary sources of the pressurized fluid include upstream feed lines, tanks, or vessels that can be pressurized by pumps, gravity (head pressure), or some kind of propellant.

In certain embodiments, valve 10 may be equipped with one or more features that assist or enhance the usage of the valve in specific applications. For example, valve 10 may be equipped with a pressure gauge 22 that is configured to measure the pressure of the pressurized fluid contained within the vessel to which valve 10 is attached. A separate pressure gauge can be connected to the outlet side of the valve 10 as well. A port 24, sealed with a rupture disc 25 carried by cap 26, may be provided within the valve body 12 that safeguards against over-pressurization on the inlet side of the valve 10. Valve 10 may be equipped with a side port 28 that is configured to be attached to a source that is capable of supplying a fluid that can be used to reset the valve (i.e., shift the valve from the valve open to valve closed configuration) as described in further detail below. A connector 29 may be provided to assist with attachment to this fluid. The valve body 12 may also comprise one or more transverse bores 30, 32 that are configured to receive a pin, which locks the valve in the valve closed configuration when the valve or vessel containing the pressurized fluid is being serviced. Valve 10 may further comprise an actuation fluid passage 34 that is connected to a source of an actuating fluid that is operable to shift the valve 10 from the valve closed configuration to the valve open configuration as described below.

Figure 5:
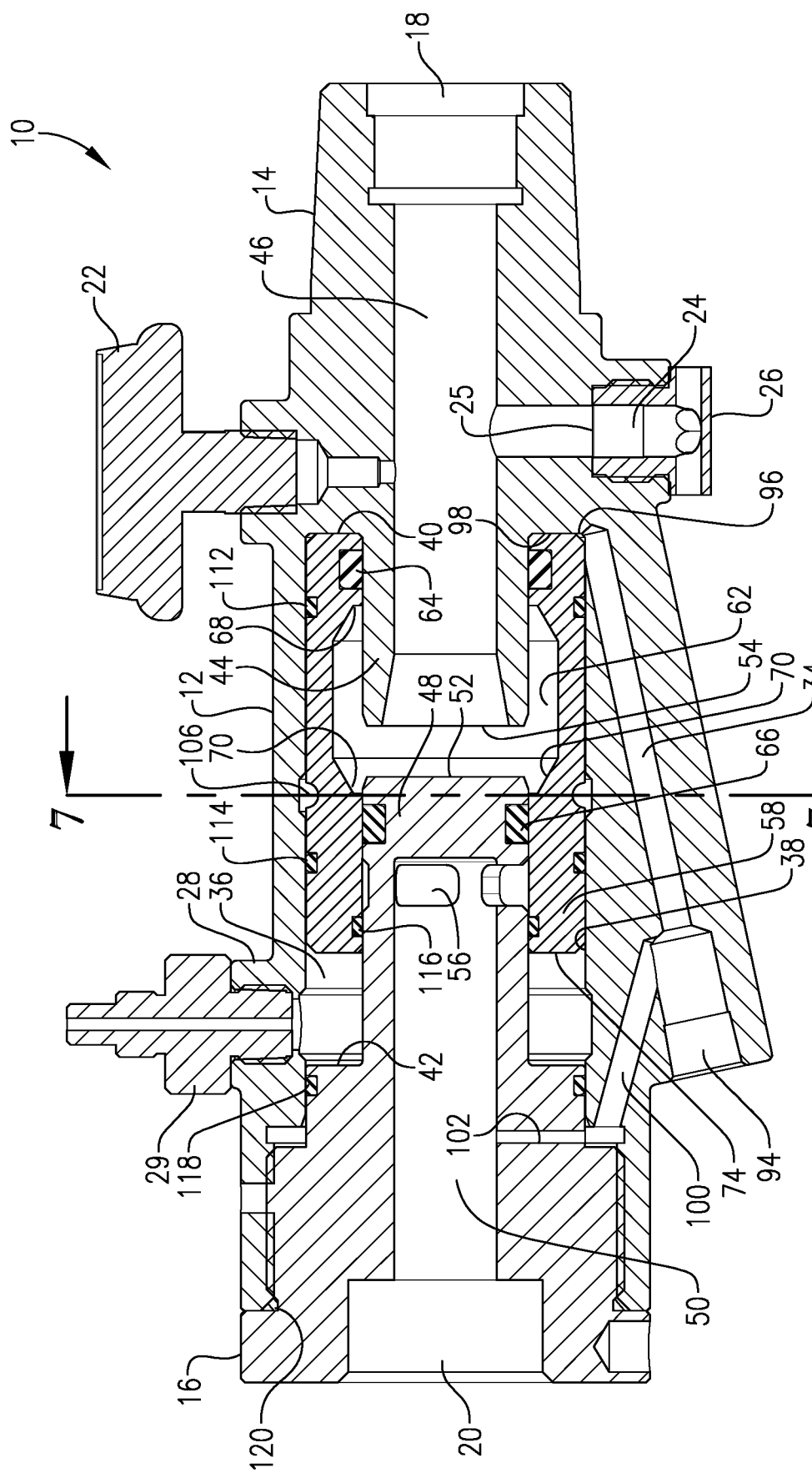
FIG. 5 is a cross-sectioned view of the valve of FIG. 1 in the valve closed configuration.
Figure 6:
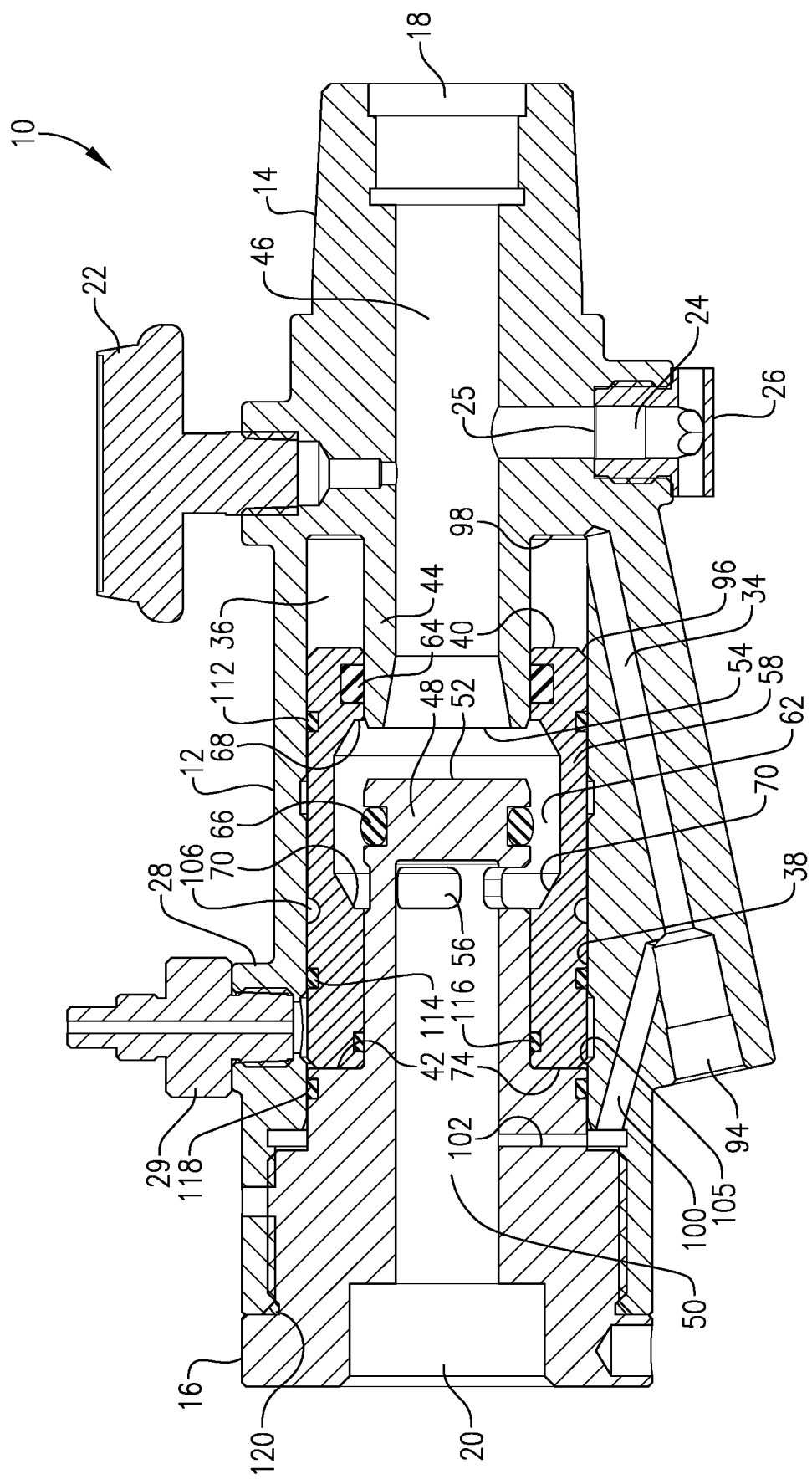
FIG. 6 is a cross-sectioned view of the valve of FIG. 1 in the valve open configuration.

As best seen in FIGS. 5 and 6, valve body 12 defines a valve chamber 36. As illustrated, the valve inlet section 14 comprises an inner circumscribing sidewall surface 38 and an annular end wall 40 (FIG. 6). Valve outlet section 16 comprises an opposed annular end wall 42. Sidewall surface 38 and end walls 40, 42 generally define the valve chamber 36. It is within the scope of the present invention for valve chamber 36 to be configured differently, such as the sidewall surface 38 being a part of the valve outlet section 16.

In one or more embodiments, the valve inlet section 14 further comprises an inlet tubular member 44 that extends into the valve chamber 36. Inlet tubular member comprises an inlet passage 46 that interconnects the valve inlet 18 and the valve chamber 36. In one or more embodiments, the outlet valve section 16 comprises an outlet tubular member 48 that extends into the valve chamber 36 and comprises a selectively closable outlet passage 50 that is configured to conduct a pressurized fluid flowing through the valve 10 toward the valve outlet 20. In one or more embodiments, the outlet tubular member 48 comprises a sealed end 52 that faces the open end 54 of inlet tubular member 44. Outlet tubular member 48 comprises one or more ports 56 that are transverse to the outlet passage 50.

Valve 10 further comprises a shuttle 58 that is located within the valve chamber 36. In one or more embodiments, shuttle 58 is generally cylindrical and comprises a central bore 60 formed therethrough. Shuttle 58 is slidably received over the inlet tubular member 44 and the outer tubular member 48. The shuttle bore 60 defines a shuttle chamber 62, which when the valve 10 is assembled, occupies a portion of valve chamber 36. The shuttle chamber 62 communicates with inlet passage open end 54 thereby permitting the pressurized fluid to fill the chamber 62 when the valve 10 is coupled to a vessel or pipework system containing a pressurized fluid as described above. A pair of seals 64, 66 ensure that fluid does not escape the shuttle chamber 62. Seals 112 and 114 are provided between the valve body 12 and shuttle 58 to prevent leaking of fluids in between sections of the valve chamber 36. Seal 116 is provided between the shuttle 58 and the outlet tubular member 48 to prevent leaking of fluids from outlet passage 50 into valve chamber 36. A seal 118 is provided between valve inlet section 14 and valve outlet section 16 to prevent leaking of fluids from valve chamber 36. A seal 120 is provided to prevent fluids flowing through narrowed segment 102, which is described in greater detail below) from leaking at the threaded connection between valve inlet section 14 and valve outlet section 16.

The shuttle 58 is shiftable, and more particularly slidable, within the valve chamber 36 between a valve closed configuration, as shown in FIG. 5, and a valve open configuration, as shown in FIG. 6. In the valve closed configuration, the shuttle is positioned up against end wall 40 of the valve inlet section 14. In this configuration, the shuttle covers ports 56 thereby blocking communication between outlet passage 50 and the shuttle chamber 62. In the valve open configuration, the shuttle is positioned up against end wall 42. In this configuration, ports 56 are now uncovered thereby permitting the flow of pressurized fluid through shuttle chamber 62, through ports 56, and into outlet passage 50.

There are several ways in which the valve 10, and especially shuttle 58, can be configured to hold the shuttle in either the valve open or valve closed configurations. In the embodiment illustrated in FIGS. 5 and 6, the shuttle chamber 62 comprises interior surfaces 68, 70 upon which the pressurized fluid acts to produce forces upon the shuttle 58 in opposed directions. Particularly, the force acting upon surface 68 biases the shuttle toward the valve closed configuration, while the force acting upon surface 70 biases the shuttle toward the valve open configuration. Note, the surfaces 68, 70 need not be configured to have all or any portion that is perpendicular to the axis along which shuttle 58 slides. Rather, the surfaces need to be configured so that the fluid can exert a force having a force vector that is parallel to the axis along which shuttle 58 slides. In this embodiment, surfaces 68, 70 are substantially equivalent in configuration and area, thus the force acting upon surface 68 is substantially the same as the force acting upon surface 70. Therefore, in this embodiment, the internal forces within the shuttle chamber do not affect shifting of the shuttle 58. Rather, shuttle 58 is influenced primarily by friction forces (between the shuttle 58 and the valve body 12) and gravity, when the valve is installed in a vertical orientation. Accordingly, frictional and gravitational forces operate on shuttle 58 to maintain the shuttle in the valve closed configuration when the valve is installed vertically with the inlet at a lower elevation than the outlet.

Figure 8:
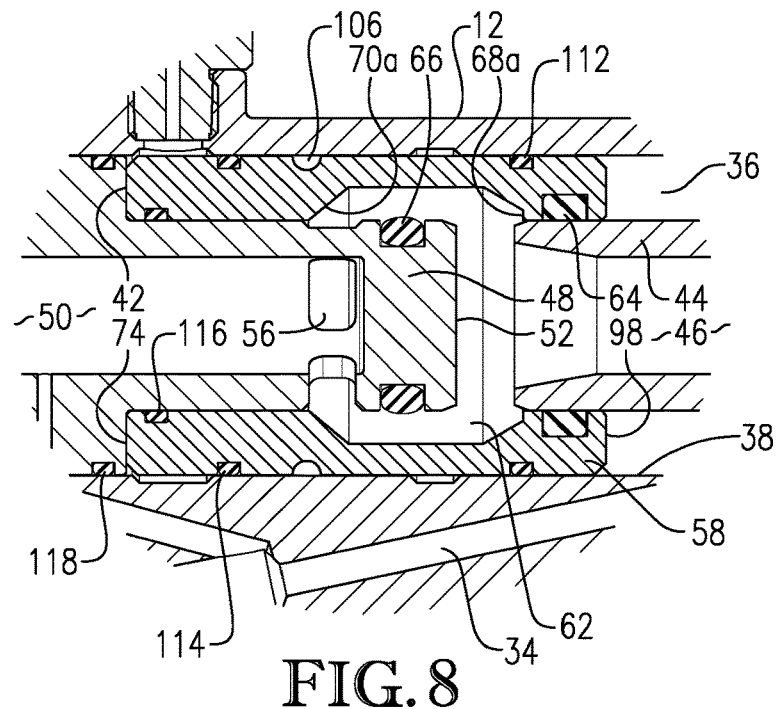
FIG. 8 is a cross-section view of an alternate valve embodiment made in accordance with the present invention in which the shuttle chamber surfaces are configured so that the pressurized fluid biases the shuttle to the valve closed configuration.

In order to provide additional surety that the valve 10 will be maintained in the closed configuration until it is desired to open the valve, the valve can be configured with a biasing element or structure that biases the valve toward the closed configuration. Turning to FIG. 8, an alternate shuttle configuration is depicted in which the surfaces 68a, 70a are not configured equivalently. Surface 68a is configured so that the pressurized fluid within chamber 62 exerts a greater force in a direction that is parallel to the shuttle's longitudinal axis surface 70a. Accordingly, the pressurized fluid in chamber 62 exerts a greater force in the direction of the valve inlet 18 than in the direction of the valve outlet 20. Thus, the pressurized fluid in chamber 62 biases shuttle 58 toward the valve closed configuration.

Figure 9:
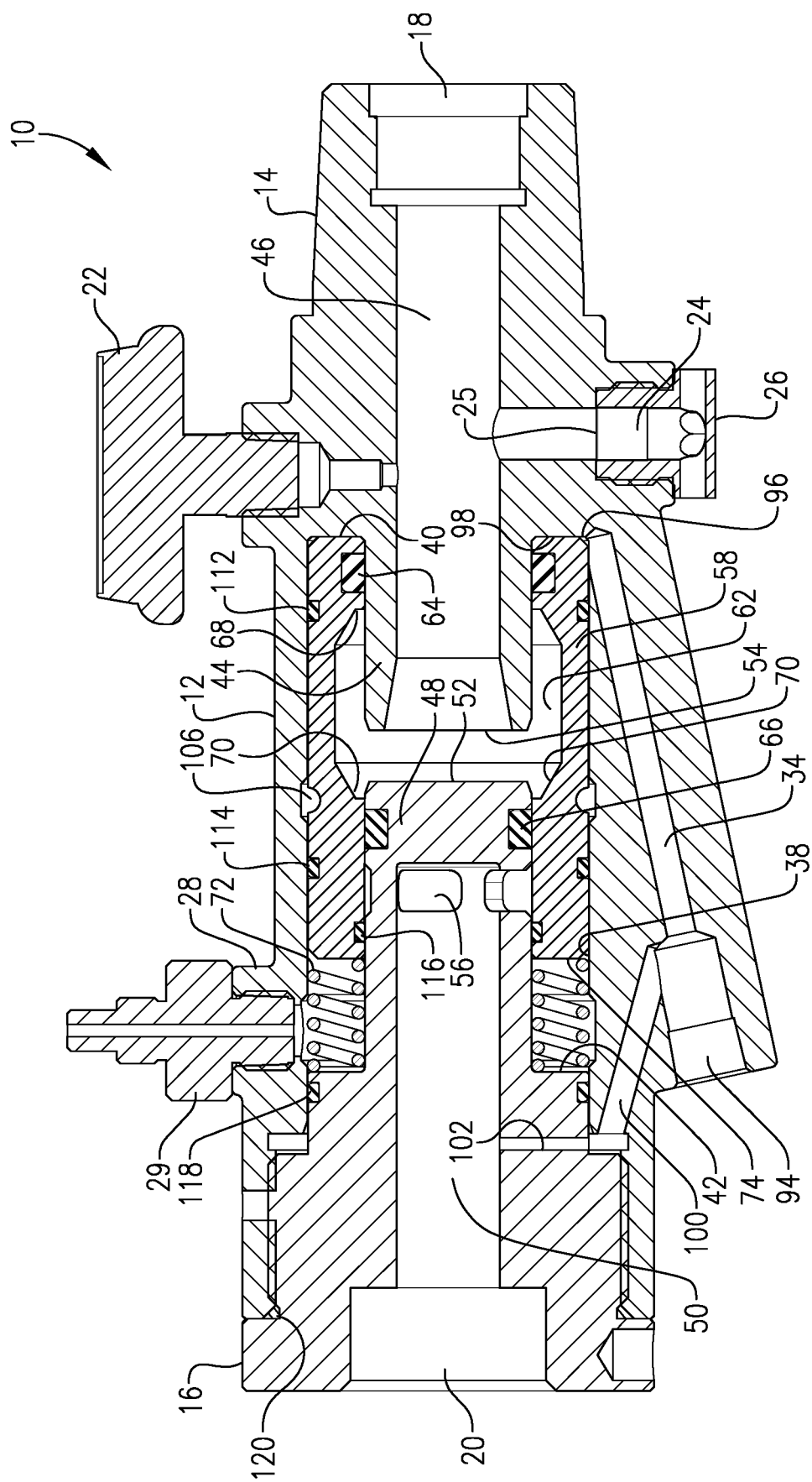
FIG. 9 is a cross-section view of an alternate valve embodiment in which a spring is used within the valve chamber to bias the shuttle to the valve closed configuration.

FIG. 9 illustrates yet another embodiment in which the valve 10 comprises a biasing element. In this embodiment, the biasing element is a spring 72 that is positioned within the valve chamber 36. Spring 72 is positioned between end wall 42 and shuttle end wall 74 under compression. Thus, spring 72 biases shuttle 58 toward the valve closed configuration. The rest of valve 10 is configured as shown in FIGS. 5 and 6, and in particular shuttle surfaces 68, 70 are of substantially equivalent configuration so that the pressurized fluid within chamber 62 has a negligible effect, if any, on the position of the shuttle 58.

Figure 10:
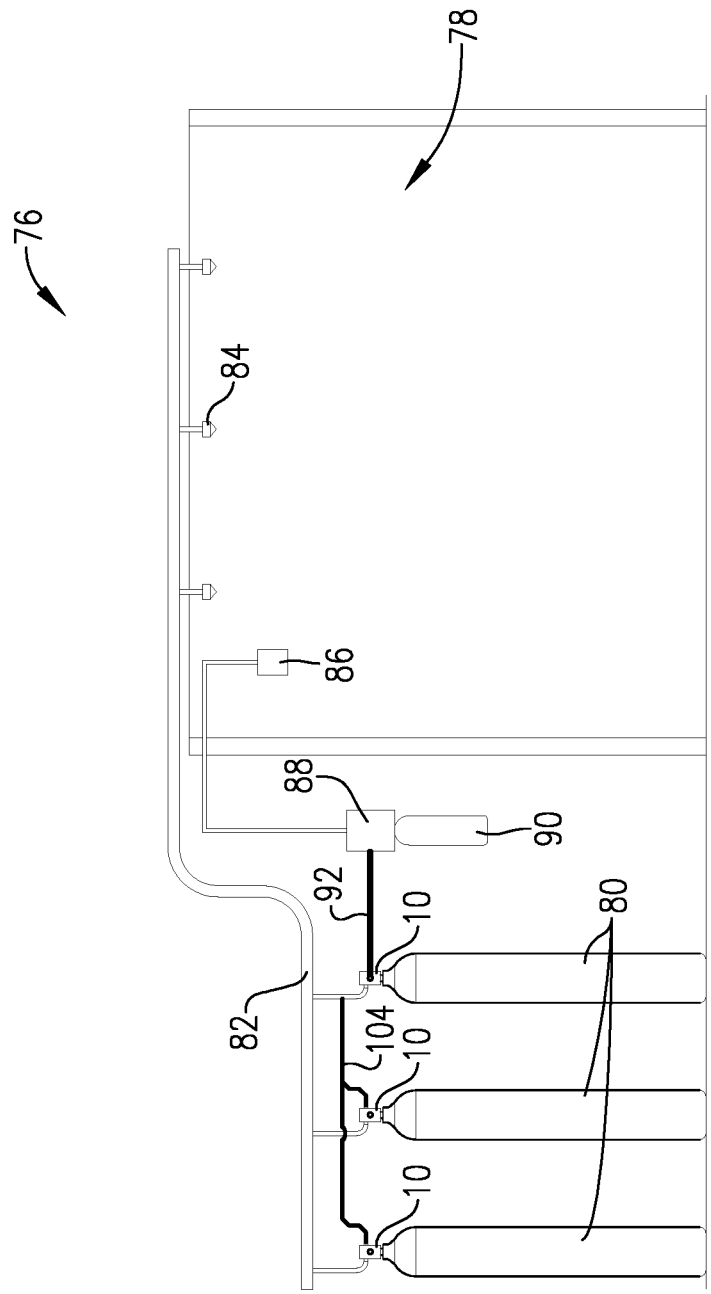
FIG. 10 is a schematic view of a fire suppression system according to an embodiment of the present invention.

FIG. 10 illustrates the use of valve 10 as a part of a fire suppression system 76 that is configured to protect area 78. A valve 10 is attached to each of one or more vessels 80 comprising a fire suppression agent, such as FM-200, NOVEC 1230, nitrogen, carbon dioxide, and/or argon. The outlet 20 of each valve 10 is connected to a pipe network 82 to which one or more nozzles 84 are attached and which are located within the protected area 78. In one embodiment, a sensor 86 that is configured to detect a fire hazard can be installed within the protected area 78. Alternatively, other types of system detectors and actuators, including manual actuators can be used along with or in place of sensor 86.

In one embodiment, upon detection of a fire hazard within protected area 78, a signal is sent to an actuator 88, which comprises a valve attached to a source of actuation fluid 90. In certain embodiments, the actuation fluid can be the same as the fire suppression agent, or it can be any other type of inert gas, such as carbon dioxide or nitrogen. The actuation fluid is released and carried via line 92 to valve 10. Line 92 may be connected to an inlet 94 of actuation fluid passage 34. The actuation fluid from source 90 enters the actuation fluid passage 34 and is introduced into valve chamber 36 behind a chamfered edge 96 of shuttle 58. The actuation fluid exerts sufficient force between shuttle end wall 98 and inlet section end wall 40 to overcome frictional, gravitational, and/or any biasing forces tending to maintain the shuttle 58 in the valve closed configuration, such as the force of the fluid acting upon shuttle surface 68, and cause the shuttle to slide to the valve open configuration as shown in FIG. 6.

The valve body 12 also comprises a relief passage 100 that interconnects the actuation fluid passage 34 with the outlet passage 50. In certain embodiments, relief passage 100 may comprise a narrowed segment 102 having a reduced diameter relative to other portions of the relief passage and/or actuation fluid passage 34. In certain embodiments, a nut can be inserted into inlet 94 that seals off relief passage 100 to prevent loss of actuation fluid pressure. In other embodiments, discussed in further detail below, the inlet 94 is itself sealed while permitting communication between relief passage 100 and actuation fluid passage 34 to permit fluid supplied through the valve outlet 20 to cause the valve to open. It is noted that in certain embodiments of the present invention, the pressure of the actuation fluid introduced into the valve chamber 36 is of a relatively low magnitude compared to the pressure of the fluid located within the shuttle chamber 62. In certain embodiments, the force required to shift the shuttle 58 from the closed to the open configuration is less than 200 psig, less than 100 psig, less than 75 psig, less than 50 psig, less than 30 psig, less than 25 psig, or less than 20 psig. In certain embodiments, the force required to shift the shuttle 58 from the closed to the open configuration is less than 5 times, less than 7 times, less than 10 times, or less than 12 times than the pressure of the fluid being retained on the inlet side of the valve 10. In one or more embodiments, the actuation fluid introduced into the valve chamber 36 via actuation fluid passage 34 has a pressure of from about 5 psig to about 100 psig, from about 10 psig to about 75 psig, or from about 15 psig to about 50 psig.

As a result of the shifting of the shuttle 58 to the valve open configuration, the ports 56 of outlet tubular member 48 are uncovered and the pressurized fire suppression agent contained within the shuttle chamber 62 can flow into outlet passage 50, out of valve outlet 20, and into pipe network 82. The fire suppression agent or pressurized fluid is then released into the protected area 78. In one or more embodiments, a portion of the fluid flowing through outlet passage 50 enters narrowed segment 102, relief passage 100, and actuation fluid passage 34. Thus, these passages form a kind of feedback loop in which the outlet pressure is used to maintain the valve 10 in the open configuration.

As illustrated, in FIG. 10, the suppression system 76 is configured so that release of fire suppression agent from one of the vessels 80 will trigger opening of the remaining valves 10. Thus, the actuator 88 need only be configured to operate a single valve 10 among a plurality of valves and vessels. In this embodiment, a side stream 104 of suppression agent is withdrawn from the outlet of the first valve and directed to the inlet 94 of the actuation fluid passage 34 of other valves 10 within system 76. In another embodiment, as opposed to the use of side streams 104, fluid released into distribution pipe 82 by actuation of the initial valve 10 can be directed into the valve outlet 20 of one or more other valves 10 making up the system. The fluid would flow through outlet passage 50, through narrowed segment 102 and relief passage 100 and into actuation fluid passage 34. In this embodiment, inlet 94 would be plugged or capped. Alternatively, actuator 88 can be configured to directly control each valve 10 within system 76.

After release of the fire suppression agent, the vessels 80 can be refilled and the valves 10 reset to the valve closed configuration. For those embodiments in which valve 10 comprises a spring 72 that biases the valve to the closed configuration, the exhaustion of the fire suppression agent and actuating fluid from source 90 eliminates any opening force acting upon shuttle 58. Thus, the force upon shuttle 58 supplied by spring 72 becomes dominant and the valve can automatically close, provided that spring 72 is capable of overcoming any frictional forces opposed to shifting of the shuttle 58. However, if the valve 10 is configured so that there is no internal biasing force acting upon the shuttle 58, an external force may need to be applied to the shuttle in order to shift it to the valve closed configuration. In this regard, a closing fluid can be introduced into the valve chamber 36 via port 28. The closing fluid flows around chamfered edge 105 of the shuttle end wall 74 and exerts sufficient force between shuttle end wall 74 and outlet section end wall 42 to overcome frictional forces and the force of any actuating fluid remaining within the valve chamber 36 tending to maintain the shuttle 58 in the valve open configuration. Thus, the closing fluid causes the shuttle to slide to the valve closed configuration as shown in FIG. 5. Any actuating fluid remaining within valve chamber 36 may be forced into outlet passage 50 via relief passage 100. The closing fluid comprises any pressurized fluid capable of imparting sufficient force to shift the shuttle 58. In certain embodiments, the closing fluid may comprise the same fire suppression agent contained within vessel 80, another compressed inert gas, or compressed air.

In one or more embodiments, valve 10 is configured so that the valve inlet 18 and valve outlet 20 are substantially co-axial or are positioned along axes that are substantially parallel. In this manner, the flow of pressurized fluid enters the valve inlet 18 in substantially the same direction in which it exits the valve outlet 20. In one or more other embodiments, valve 10 may be configured so that the inlet passage 46 and the outlet passage 50 are both in registry with the valve inlet 18 and the valve outlet 20. In any of these embodiments, the force produced by expelling the pressurized fluid from the valve 10 is along the longitudinal axis or parallel to the longitudinal axis of the vessel 80 and the vessel outlet. Thus, in one or more embodiments, the discharge of fluid through valve 10 does not result in producing forces that are transverse to the longitudinal axis of the vessel 80 which could result in creation of a torque that could overturn the vessel 80.

Figure 3:
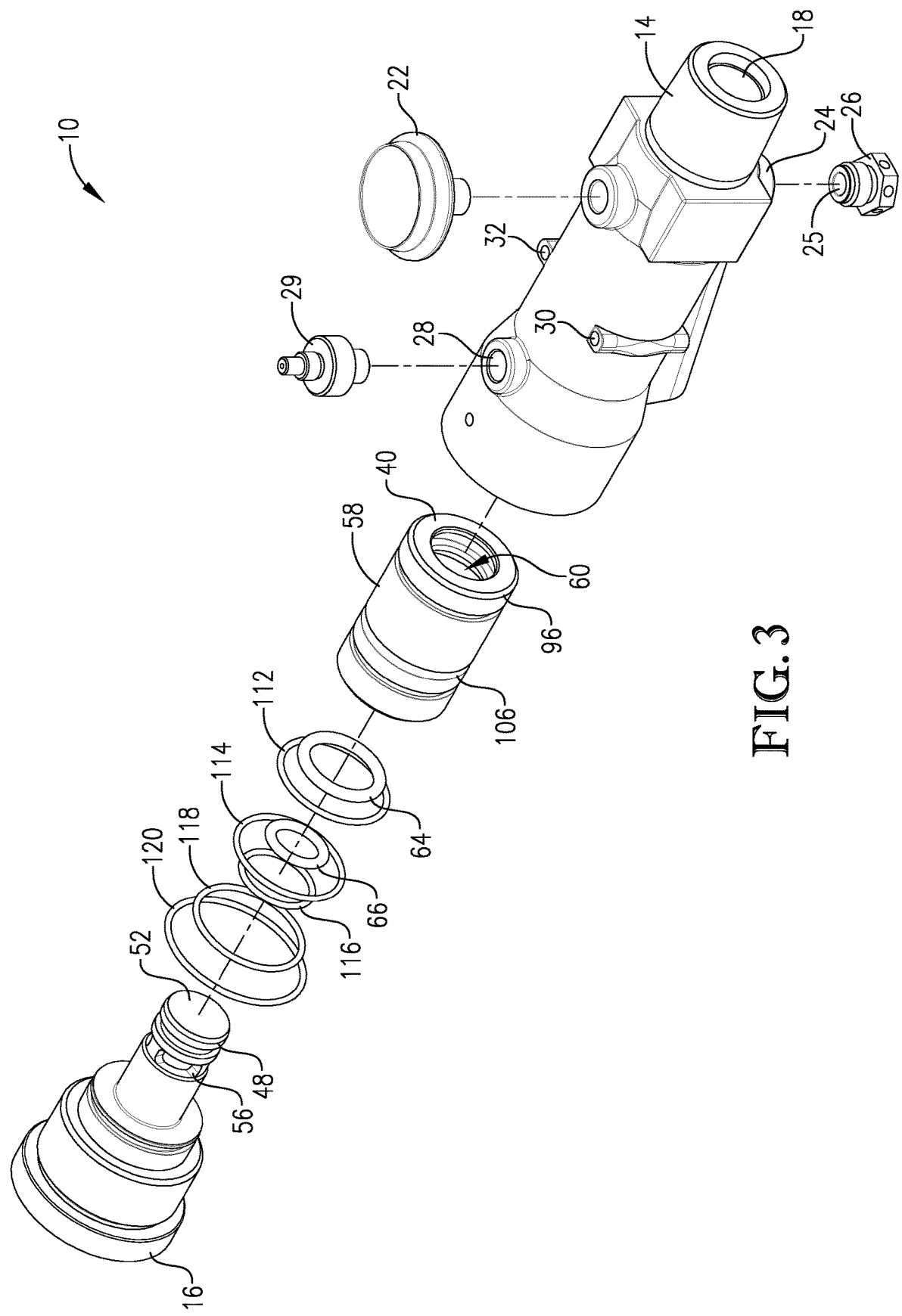
FIG. 3 is an exploded view of the valve of FIG. 1.
Figure 4:
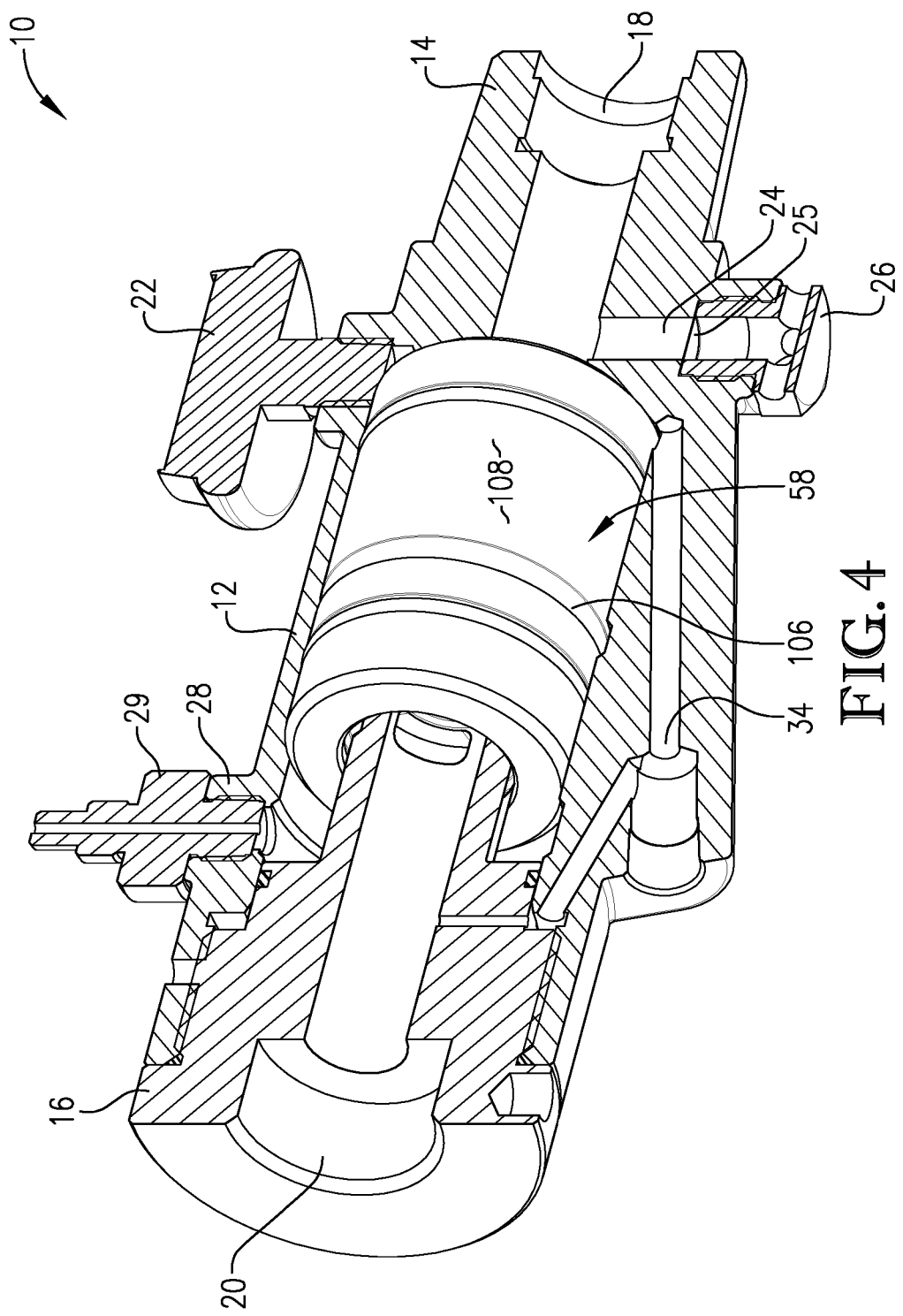
FIG. 4 is a partially sectioned view of the valve of FIG. 1.
Figure 7:
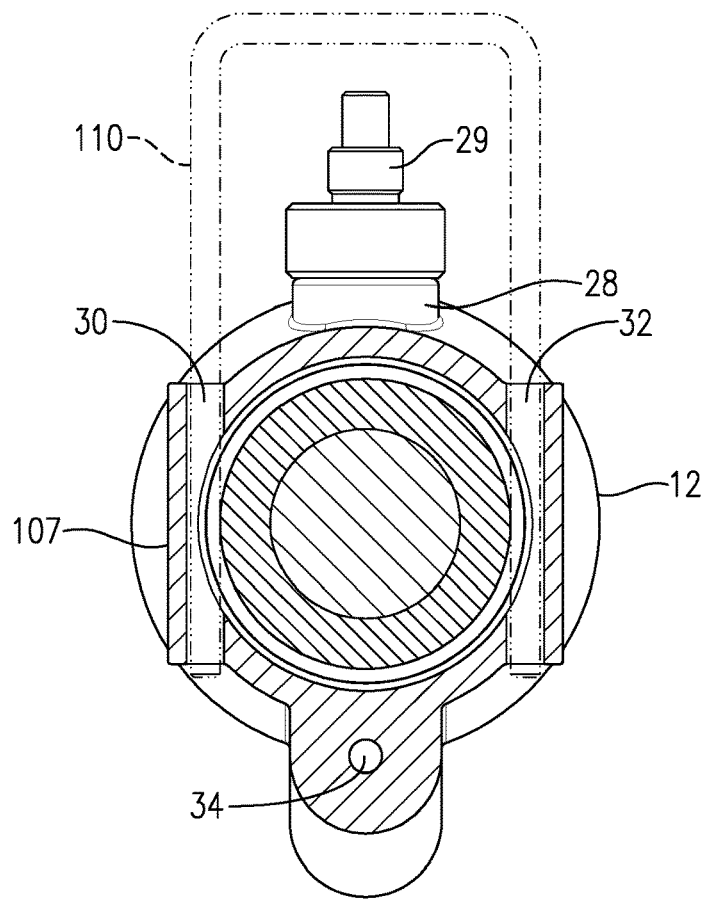
FIG. 7 is a cross-sectioned view of the valve of FIG. 1 taken along line 7-7 of FIG. 5.

An additional safety feature that may be included in certain embodiments of the present invention is the ability to mechanically lock the position of the shuttle 58 so that inadvertent opening of the valve is inhibited. Turning to FIG. 7, transverse bores 30, 32 are formed in the sidewall 107 of valve body 12. Further, as can be seen in FIGS. 3 and 4, shuttle 58 can comprise a channel 106 that extends around at least a portion of an outer shuttle surface 108 that faces the valve body 12. The bores 30, 32 and channel 106 are configured to align when the shuttle 58 is in the valve closed configuration thereby permitting a pin 110 to be inserted through bores 30, 32 and portions of channel 106. Pin 110 inhibits relative movement of the shuttle 58 relative to the valve body 12. This feature permits servicing of the suppression system 76 to occur while vessel 80 is charged with fire suppression agent with a reduced risk of inadvertent system activation and release of suppression agent.

In addition to fire suppression applications, valve 10 can be used in a number of other, more general pipework applications. For example, valve 10 is particularly suited for use in large-diameter (e.g., 1-inch, 2-inch, 3-inch, 4-inch, 5-inch, or above pipe diameters) pipework systems. In one or more embodiments, valve 10 can be used as an on/off device for controlling the flow of a fluid through the system. In particular embodiments, valve 10 can be used as a shutoff valve for a pipeline. In such embodiments, narrowed segment 102 and relief passage 100 may be omitted from the valve and the position of shuttle 58 can be controlled by introducing fluids through port 28 and inlet 94. Such embodiments may also comprise biasing elements such as spring 72 and/or imbalanced shuttle interior surfaces 68, 70. Although, unlike fire suppression applications in which it is more imperative for the valve to remain open once actuated, in general pipeline applications the position of the shuttle is selectively controlled and biasing elements may not need to be present within the valve 10.

We claim:

1. A valve comprising:
    a valve body comprising a valve inlet section and a valve outlet section, the valve body defining a valve chamber,
    the valve inlet section comprising a valve inlet configured to be coupled to a source of a pressurized fluid, the valve inlet section further comprising an inlet tubular member that extends into the valve chamber and has an inlet passage that interconnects the valve inlet and the valve chamber,
    the valve outlet section comprising a valve outlet and an outlet tubular member that extends into the valve chamber, the outlet tubular member comprising a selectively closable outlet passage that is configured to conduct the pressurized fluid flowing through the valve toward the valve outlet; and
    a shuttle located within the valve chamber and comprising a bore formed therethrough, the shuttle being slidably received over the inlet and outlet tubular members and being shiftable between a valve closed configuration in which the shuttle blocks communication between the inlet passage and the outlet passage and a valve open configuration in which the inlet passage is in fluid communication with the outlet passage,
    the shuttle bore defining a shuttle chamber having interior surfaces upon which the pressurized fluid acts to produce a first force acting upon the shuttle in a direction of the valve closed configuration and a second force acting upon the shuttle in a direction of the valve open configuration.

2. The valve according to claim 1, wherein the shuttle chamber is configured so that the pressurized fluid contained therein biases the valve to the valve closed configuration.

3. The valve according to claim 1, wherein the first and second forces are substantially equal.

4. The valve according to claim 1, wherein the valve further comprises a spring located within the valve chamber and operable to bias the shuttle toward the valve closed configuration.

5. The valve according to claim 1, wherein the inlet passage and the outlet passage are in registry with both the valve inlet and the valve outlet.

6. The valve according to claim 1, wherein the valve further comprises an actuation fluid passage that communicates the valve chamber with a source of actuating fluid that is operable to shift the shuttle from the valve closed to the valve open configuration.

7. The valve according to claim 6, wherein the valve body comprises a relief passage that interconnects the actuation fluid passage with the outlet passage and is configured to vent the actuating fluid from within the valve chamber upon shifting of the shuttle from the valve open to the valve closed configuration.

8. The valve according to claim 6, wherein the actuating fluid is supplied through the valve outlet and into the actuation fluid passage.

9. The valve according to claim 1, wherein the shuttle comprises a recess that extends around at least a portion of an outer surface of the shuttle that faces the valve body, the valve body comprising at least one bore formed in a sidewall thereof, the at least one bore and the channel being aligned when the valve is in the valve closed configuration and being configured to receive a locking pin that inhibits movement of the shuttle relative to the valve body.

10. The valve according to claim 1, wherein the outlet tubular member comprises one or more ports formed therein that are transverse to the outlet passage, the shuttle being configured to block the one or more ports when in the valve closed configuration and to communicate the ports and the shuttle bore when in the valve open configuration.

11. The valve according to claim 1, wherein the valve body comprises a side port that is configured to introduce a closing fluid into the valve chamber that causes the shuttle to shift toward the valve closed configuration.

12. A pipework system comprising:
a source of a pressurized fluid; and
a selectively actuatable valve operably coupled to the source and configured to control the flow of the pressurized fluid through the pipework system, wherein the selectively actuatable valve comprises:
  a valve body comprising a valve inlet section and a valve outlet section, the valve body defining a valve chamber,
  the valve inlet section comprising a valve inlet that is coupled to the source, the valve inlet section further comprising an inlet tubular member that extends into the valve chamber and has an inlet passage that interconnects the valve inlet and the valve chamber,
  the valve outlet section comprising a valve outlet that comprises an outlet tubular member that extends into the valve chamber, the outlet tubular member comprising a selectively closable outlet passage that is configured to conduct the pressurized fluid flowing through the valve toward the valve outlet; and
  a shuttle located within the valve chamber and comprising a bore formed therethrough, the shuttle being slidably received over the inlet and outlet tubular members and being shiftable between a valve closed configuration in which the shuttle blocks communication between the inlet passage and the outlet passage and a valve open configuration in which the inlet passage is in fluid communication with the outlet passage;
  the shuttle bore defining a shuttle chamber having interior surfaces upon which the pressurized fluid acts to produce a first force acting upon the shuttle in a direction of the valve closed configuration and a second force acting upon the shuttle in a direction of the valve open configuration.

13. The pipework system according to claim 12, wherein the pipework system comprises a fire suppression system and the pressurized fluid comprises a fire suppression agent.

14. The pipework system according to claim 13, wherein the source of the pressurized fluid is a vessel that comprises a vessel outlet through which the fire suppression agent exits the vessel, and wherein the valve, when attached to the vessel, is configured to supply the fire suppression agent from the valve outlet in a direction that is substantially the same or parallel to the direction in which the fire suppression agent exits the vessel through the vessel outlet.

15. A method of controlling the flow of a fluid through a pipework system comprising:
providing a source of a pressurized fluid and a selectively actuatable valve operably coupled to the source and configured to control the flow of the pressurized fluid therefrom,
the selectively actuatable valve comprising:
  a valve body comprising a valve inlet section and a valve outlet section, the valve body defining a valve chamber,
  the valve inlet section comprising a valve inlet that is coupled to the vessel, the valve inlet section further comprising an inlet tubular member that extends into the valve chamber and has an inlet passage that interconnects the valve inlet and the valve chamber,
  the valve outlet section comprising a valve outlet that comprises an outlet tubular member that extends into the valve chamber, the outlet tubular member comprising a selectively closable outlet passage; and
  a shuttle located within the valve chamber and comprising a bore formed therethrough, the shuttle being slidably received over the inlet and outlet tubular members and being shiftable between a valve closed configuration in which the shuttle blocks communication between the inlet passage and the outlet passage and a valve open configuration in which the inlet passage is in fluid communication with the outlet passage,
  the shuttle bore defining a shuttle chamber having interior surfaces upon which the pressurized fluid acts to produce a first force acting upon the shuttle biasing the shuttle toward the valve closed configuration and a second force acting upon the shuttle biasing the shuttle toward the valve open configuration;
  the shuttle bore being in communication with the source of pressurized fluid with the selectively actuatable valve being in either the valve open or the valve closed configuration;
shifting the shuttle from either the valve closed or valve open configuration to the opposite configuration to either block or permit fluid communication of the shuttle bore with the outlet passage; and
delivering the pressurized fluid from the valve outlet and directing the stream of the pressurized fluid into the pipework.

16. The method according to claim 15, wherein the step of causing the shuttle to shift from the valve closed configuration to the valve open configuration comprises introducing an actuating fluid into the valve chamber, the actuating fluid acting upon the shuttle with an opening force that is greater than the first force.

17. The method according to claim 15, wherein the outlet tubular member comprises one or more ports formed therein that are transverse to the outlet passage, wherein the ports are initially covered by the shuttle when the shuttle is in the valve closed configuration and placed into communication with the shuttle bore when in the valve open configuration.

18. The method according to claim 15, wherein the flow of pressurized fluid enters the valve inlet in substantially the same direction in which it exits the valve outlet.

19. The method according to claim 15, wherein the pipework system is a fire suppression system that is configured to suppress a fire in a protected area, wherein the source of the pressurized fluid comprises a vessel containing a pressurized fire suppression agent, the valve being operable to control the flow of the fire suppression agent between the vessel and the protected area.

20. The method according to claim 19, wherein the selectively actuatable valve is initially in the valve closed configuration with the shuttle bore being in fluid communication with an interior of the vessel, and shifting of the shuttle from the valve closed configuration to the valve open configuration permits fluid communication of the shuttle bore with the outlet passage.

* * * * *